Sept. 1, 1925.　　　　　　　　　　　　　　　　　　　　1,551,610
A. I. OHMAN
TRACKING DEVICE FOR TRAILERS
Filed July 9, 1923
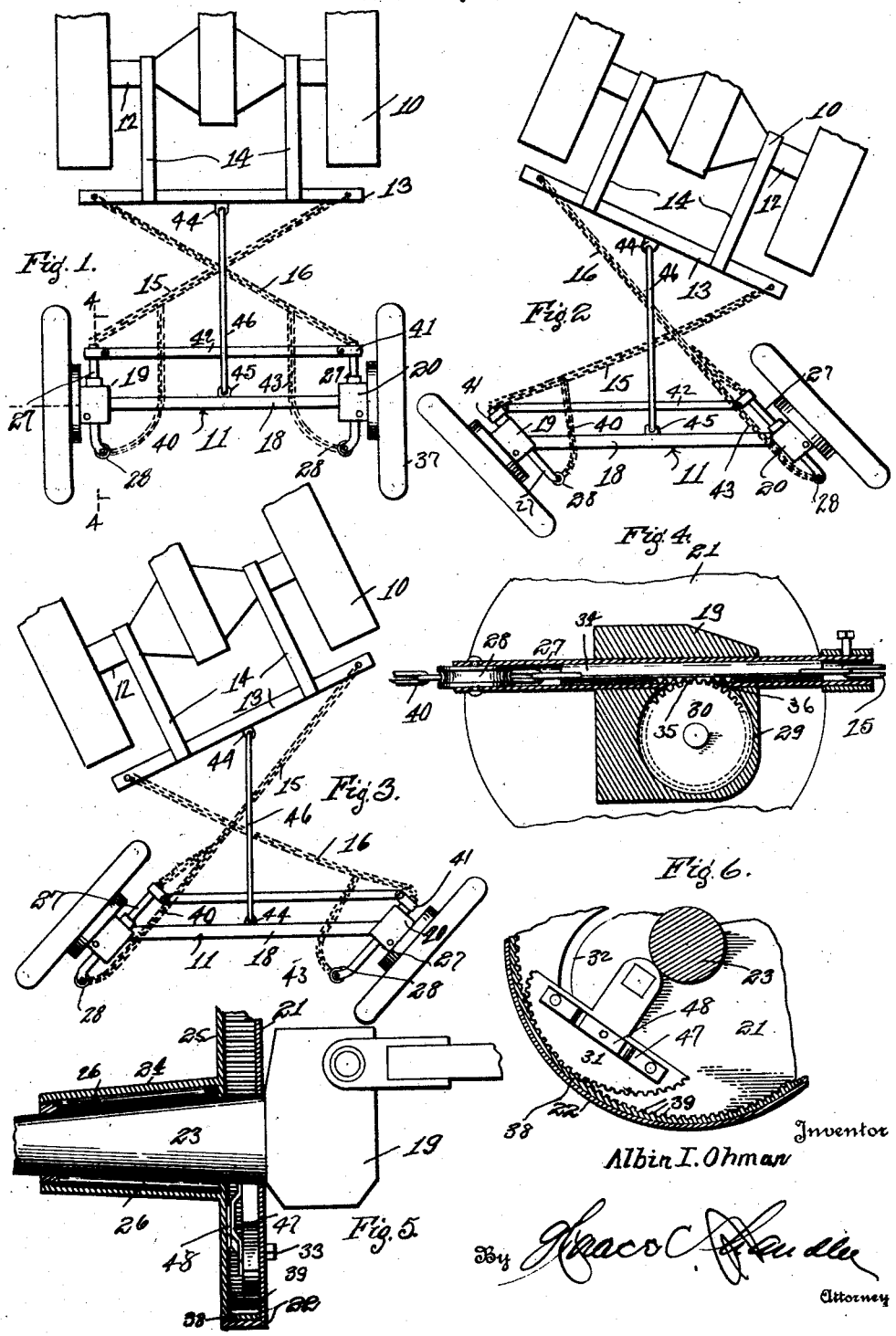
Inventor
Albin I. Ohman Patented Sept. 1, 1925.

1,551,610

UNITED STATES PATENT OFFICE.

ALBIN I. OHMAN, OF EPHRAIM, WISCONSIN.

TRACKING DEVICE FOR TRAILERS.

Application filed July 9, 1923. Serial No. 650,375.

*To all whom it may concern:*

Be it known that I, ALBIN I. OHMAN, a citizen of the United States, residing at Ephraim, in the county of Door, State of Wisconsin, have invented certain new and useful Improvements in Tracking Devices for Trailers; and I do hereby declare the following to be a full, clear, and exact description of the invention, such as will enable others skilled in the art to which it appertains to make and use the same.

This invention relates to new and useful improvements in steering mechanism and particularly to steering mechanisms for trailers.

One object of the invention is to provide a steering mechanism of this character by means of which the trailer may be readily and accurately steered when the motor machine is proceeding either forwardly or backwardly.

Another object is to provide a device of this character which is automatic in its operation, and requires no manipulation or attention of the driver of the puller machine.

Another object is to provide a device of this character which automatically shifts for positive operation, when the pulling machine changes its direction from forward to backward, and vice versa.

Other objects and advantages will be apparent from the following description when taken in connection with the accompanying drawings.

In the drawings:

Figure 1 is a plan view of the rear portion of a machine which is pulling, and the front portion of the trailer, showing the application of the present invention.

Figure 2 is a plan view showing the change of direction toward the right, while proceeding forwardly.

Figure 3 is a plan view showing the change of direction toward the right, while proceeding backwardly.

Figure 4 is an enlarged section on the line 4—4 of Figure 1, looking in the direction of the arrows.

Figure 5 is a vertical section on the line 5—5 of Figure 1, looking in the direction of the arrows.

Figure 6 is an enlarged sectional detail of a portion of one of the wheels showing the ring gear and the segmental gear engaged therewith.

Referring particularly to the accompanying drawings, 10 represents the pulling machine and 11 the trailer. The pulling machine has the rear axle 12 to which is secured the bar 13, by means of the clamps 14, said bar being disposed in parallel relation to the axle, and rearwardly thereof. Connected to the ends of the bar 13 are the chains 15 and 16, to which more particular reference will be made later herein.

The trailer is represented as a whole by the numeral 11, and includes the axle 18, on the ends of which are pivotally mounted the steering knuckles 19 and 20, respectively. To the outer face of each of the knuckles is secured a disk 21 having an outwardly extending peripheral flange 22, and extending through the center of the disk, and forming a part of the knuckle, is the axle stub 23. Rotatably supported on this stub 23 is the hub portion 24 of the outer disk 25, roller bearings 26 being disposed between the stub and the said hub. Disposed through each of the knuckles, and extending transversely of the axle 18, is a tubular member 27, the rearward end of which carries a pulley 28. Formed in the inner side of the knuckle casting is a circular socket 29 within which rotates a gear wheel 30, the shaft of which extends through the disk 21, at one side of the stub 23, where it is provided with a segmental gear 31. In the disk, concentrically with the shaft of the gear 31, is an arcuate slot 32, in which rides the lug 33 formed on the segmental gear. Slidable in the tubular member 27 is a rod 34, the same having rack teeth 35 which are engaged with the teeth of the gear 30, through an opening 36 formed in the tubular member 27, and which opening is arranged above the said socket 29. The said disk 25 forms the central portion of the wheel 37, and has the inturned peripheral flange 38 which is disposed inwardly of the flange 22 of the disk 21. The flange 38 is formed with the internal gear teeth 39 which are arranged to engage with the teeth of the segmental gear 31 to rock the same on its pivot and cause the rotation of the shaft thereof, and the driving of the rod 34 longitudinally through the tubular member 27. Secured to the opposite ends of the rod 34 are the chain 15, before-mentioned, and the chain 40, the latter chain having its other end connected with the chain 15 at a point a suitable distance forwardly of the point of connection with the rod 34. Carried by the front end of each of the tubular members 27 is a clip 41 which is pivotally connected to an end of the steering tie rod 42, by means of which both of the knuckles are caused to swing in unison.

The chain 16 has its other end secured to the forward end of the other rod 34, or that rod which is carried by the knuckle 20, engaging around the pulley 28, while a chain 43, similar to the chain 40, is connected to the other end of this other rod 34, and to the chain 16, at a point corresponding to the point of attachment of the chain 40 with the chain 15.

Connected to the center of the bar 13, by means of the ball and socket joint 44, at one end, and at its other end to the axle 18 by means of the ball and socket joint 45, is the draw-bar 46, and by means of which the trailer is pulled.

Upon forward movement being imparted to the trailer, the wheels thereof rotate in the usual manner, but by reason of the teeth on the disk 21 engaging with the teeth of the segmental gear 31, said segmental gear will be rocked on its pivot, causing the gear 30 to be rotated and the rods 34 to be moved rearwardly through the tubular members 27, with the result that the chains 15 and 16 will be drawn taut, while the chains 40 and 43 will be slackened. Upon the pulling machine turning toward the right, as shown in Figure 2, the left-hand end of the bar 13 will exert a pull on the chain 16, which in turn pulls on the forward end of the tubular member 27, and the rod 34, resulting in the swinging of the knuckle 20 and directing the wheels toward the outside of the curve. Thus the trailer will properly track after the pulling machine. A turn to the left will cause the chain 15 to be pulled, and the wheels swung toward the right, or toward the outside of the curve.

When the motor car is to proceed in the other direction, that is backwardly, to push the trailer, the wheels of the trailer will, of course, rotate in the opposite direction from that first described. Upon rotation of the trailer wheels, backwardly, the internal gear disks 21 and 25 will pick up the segmental gears 31, and swing them to the opposite ends of their paths of movement, which will cause the gears 30 to slide the rods 34 forwardly whereby the chains 40 and 43 will be brought into taut condition, while the portions of the chains 15 and 16, between the points of attachment of the chains 40 and 43 therewith, and the rollers 28, will be slackened. Upon the motor car turning toward the right, the chain 15 will be pulled, which will swing the left-hand knuckle 20, of the trailer, so that the wheels of the trailer will be steered toward the right, and the trailer pushed around the curved portion of the road, ahead of the motor car.

From the foregoing it will be readily seen that the trailer may be accurately guided, both to track behind the motor car, and to move ahead thereof, in accordance with the direction of movement of the motor car. Furthermore, the chains will be automatically tightened and slackened, according to the direction of procedure of the motor car, thereby obviating any attention on the part of the driver of the motor car.

Secured to the segmental gear 31 is a leaf spring 47, which carries a friction member 48, arranged to engage with the inner face of the disk 25, so that when the wheel, forming a part of the disk, rotates, the swinging of the segmental gear, into mesh with the internal or ring gear of the disk, will be assured.

What is claimed is:

1. In a trailer steering mechanism, a propelling car, a trailer car, draft connections between the cars, dirigible wheels on the trailer car, flexible connections between the propelling car and the dirigible wheels, and means operable by the said wheels for tightening certain of the flexible connections and loosening certain others of said connections whereby to steer the said wheels in forwardly or backwardly directions.

2. In a trailer steering mechanism, a propelling car, a trailer car, draft connections between the cars, dirigible wheels on the trailer car, slidable elements mounted adjacent and movable with the said wheels upon steering thereof, flexible elements connected to the ends of the slidable elements and to the propelling car, flexible elements connected to the slidable elements and to the first flexible elements, and means operable by the rotation of said wheels for tightening certain of the flexible elements and loosening certain of the flexible elements whereby to steer said wheels upon movement of the propelling car backwardly and forwardly.

3. In a trailer steering mechanism, a propelling car, a trailer car, draft connections between the cars, knuckles on the trailer car, wheels on the knuckles, slidable elements on the knuckles, flexible elements connected to the slidable elements and to the propelling car, flexible elements connected to the slidable elements and to the first flexible elements, and means operable by the rotation of the said wheels for adjusting the flexible elements to steer the knuckles upon movement of the propelling car forwardly or backwardly.

4. In a trailer steering mechanism, a propelling car, a trailer car, draft connections between the cars, steering knuckles on the trailer car, wheels rotatably supported on the knuckles, slidable rods mounted on the knuckles, a chain connected to each of the rods and to the propelling car, a second chain connected to a rod and to the first chain, means for sliding the rods, and means operable by the wheels, upon rotation thereof in either direction, for actuating the sliding means for adjusting the chains to steer the knuckles upon movement backwardly or forwardly of the propelling and trailer cars.

5. In a trailer steering mechanism, a propelling car and a trailer car operatively connected therewith, steering knuckles on the trailer car, wheels on the knuckles, slidable rods on the knuckles, chains connected to the rods and to the propelling car, chains connected to the other ends of the rods and to the first chains, a gear carried by each knuckle and operatively engaged with a rod, a segmental gear carried by the first gear, a ring gear on a wheel for moving engagement with a segmental gear to slide a rod and thereby tighten certain chains and loosen others, and means on the segmental gear for frictional engagement with the wheel for causing the engagement of the segmental gear with the ring gear.

In testimony whereof, I affix my signature.

ALBIN I. OHMAN.